United States Patent

MacPherson

(10) Patent No.: US 9,448,304 B2
(45) Date of Patent: Sep. 20, 2016

(54) GROUND MOVING TARGET INDICATOR (GMTI) RADAR THAT CONVERTS RADAR TRACKS TO DIRECTED GRAPHS (DG), AND CREATES WEIGHTED DGS ALIGNED WITH SUPERIMPOSED WITH DIGITAL MAPS

(71) Applicant: SRC, Inc., North Syracuse, NY (US)

(72) Inventor: David L. MacPherson, Lansing, NY (US)

(73) Assignee: SRC, Inc., North Syracuse ( * ) Notice: Subject to any disclaimer, the term of this patent is extended or adjusted under 35 U.S.C. 154(b) by 409 days.

(21) Appl. No.: 14/204,850

(22) Filed: Mar. 11, 2014

(65) Prior Publication Data

US 2014/0279820 A1    Sep. 18, 2014

Related U.S. Application Data

(60) Provisional application No. 61/790,253, filed on Mar. 15, 2013.

(51) Int. Cl.
| | |
|---|---|
| G06F 17/00 | (2006.01) |
| G01S 13/66 | (2006.01) |
| G06N 5/02 | (2006.01) |
| G01S 7/00 | (2006.01) |
| G01S 13/72 | (2006.01) |
| G01S 13/524 | (2006.01) |

(52) U.S. Cl.
CPC ............. *G01S 13/66* (2013.01); *G01S 7/003* (2013.01); *G01S 13/723* (2013.01); *G06N 5/022* (2013.01); *G01S 13/5242* (2013.01)

(58) Field of Classification Search
CPC ..................................... G06T 1/0007
USPC .................................... 706/12, 45
See application file for complete search history.

(56) References Cited

U.S. PATENT DOCUMENTS

| 6,260,759 B1 | 7/2001 | Nguyen et al. |
| 6,400,306 B1 | 6/2002 | Nohara et al. |

(Continued)

FOREIGN PATENT DOCUMENTS

CN         101614817         12/2009

OTHER PUBLICATIONS

Daun et al., Tracking of ground targets with bistatic airborne radar. IEEE Radar Conference [Online] 2008, pp. 1-6.

(Continued)

*Primary Examiner* — David Vincent
(74) *Attorney, Agent, or Firm* — Bond Schoeneck & King, PLLC; George McGuire

(57) ABSTRACT

The present invention is directed to a system that includes a semantic reasoning engine that is configured to convert radar track data into a directed graph representation (DGR) of the predetermined surveillance region and iteratively combine the DGRs to create a weighted directed graph (WDG) aligned and superimposed with the digital map data. The WDG includes first WDG elements corresponding to moving objects detected by a radar system. The WDG is compared to historical data to obtain a surveillance detection parameter. An alarm message is generated if the surveillance detection parameter deviates from the historical data by a predetermined amount. An output device is coupled to the semantic reasoning engine and is configured to provide a representation of the digital map data, the WDG and the at least one alarm message.

28 Claims, 10 Drawing Sheets

(56) References Cited

U.S. PATENT DOCUMENTS

| | | |
|---|---|---|
| 6,690,318 B1 | 2/2004 | Tsunoda |
| 6,816,109 B1 | 11/2004 | Schwartz |
| 6,982,668 B1 | 1/2006 | Doerry et al. |
| 7,123,169 B2 | 10/2006 | Farmer et al. |
| 8,207,887 B2 | 6/2012 | Goldman |
| 2005/0128138 A1* | 6/2005 | McCabe ............... G01S 13/723 342/195 |
| 2009/0015460 A1* | 1/2009 | Fox ...................... G01S 7/2922 342/53 |
| 2010/0283669 A1 | 11/2010 | Discamps et al. |
| 2013/0087708 A1* | 4/2013 | Tillotson ............... G01N 21/71 250/338.5 |
| 2013/0236047 A1* | 9/2013 | Zeng .................... G01S 13/726 382/103 |

OTHER PUBLICATIONS

Lattice Technology Group, Inc., About Us. [Online] 2012. http://www.latticetech.net/aboutus.shtm (accessed Aug. 7, 2012), pp. 1-4.

Mertens et al., Precision GMTI Tracking using Road Constraints with Visibility Information and a Refined Sensor Model. IEEE Radar Conference [Online] 2008, pp. 1-6.

Simonis, OWS-8 Analysis of OGC Standards for Supporting Mobile Object Processing Implementation (Engineering Report). [Online] 2012, pp. 1-67. https://portal.opengeospatial.org/files/?artifact_id=46170 (accessed Aug. 7, 2012).

* cited by examiner

GROUND MOVING TARGET INDICATOR (GMTI) RADAR THAT CONVERTS RADAR TRACKS TO DIRECTED GRAPHS (DG), AND CREATES WEIGHTED DGS ALIGNED WITH SUPERIMPOSED WITH DIGITAL MAPS

CROSS-REFERENCE TO RELATED APPLICATIONS

This is application claims priority to U.S. Provisional Patent Application Ser. No. 61/790,253 filed on Mar. 15, 2013, the content of which is relied upon and incorporated herein by reference in its entirety, and the benefit of priority under 35 U.S.C. §119(e) is hereby claimed.

GOVERNMENT RIGHTS

The invention was conceived or reduced to practice under U.S. Government Contract Number DARPA Contract DO343. The U.S. Government may have limited rights to practice the invention.

BACKGROUND OF THE INVENTION

1. Field of the Invention

The present invention relates generally to tracking targets for situational awareness, and more particularly to ground moving target indicator analysis.

2. Technical Background

For most of the last century and continuing on to the present era, the times have been marked by a continual succession of wars, insurgencies, terrorism and other such acts of violence. One of the issues routinely encountered by military and law enforcement decision makers relates to the availability (or unavailability) of concrete and actionable intelligence. These decision makers need to know who the enemy is, where the enemy is, what his numbers are, and how he is arrayed before they can counter him effectively. In order to substantially lift the fog of war, the military performs intelligence, surveillance, and reconnaissance (ISR) operations to obtain the information outlined above. In many cases, ISR operations are augmented by target acquisition operations prior to destroying an identified threat.

During a typical ISR operation, raw information is collected from various sensors that are deployed on the battlefield and passed to ISR analysts for processing. Because the ISR analyst may be monitoring many different sensors, he is often overwhelmed by the vast amount of data that pours in. This data my include radar data, human intelligence data, electro-magnetic emission data, video and the like. In a perfect world, an individual analyst would be able to sort through the individual pieces and assemble them into a coherent picture that can be used by the decision makers. The reality is far different. Often, much of the data collected by ISR sensors are wasted because of the time constraints of a live situation; the typical ISR operator does not have the ability to process all of this information in a timely way.

One reason for the limited effectiveness of conventional ISR operations relates to the limited number of adequately trained intelligence analysts. The supply is limited because there are relatively high costs associated with training ISR personnel. Moreover, the skillsets of the trained ISR analysts are not uniform and can vary a great deal from person to person. The aforementioned issues are further complicated by the fact that many surveillance missions are continuously operational, i.e., the ISR shop is open twenty-four (24) hours a day, seven (7) days a week. This demanding schedule requires the availability of at least one ISR analyst around the clock. Accordingly, analyst fatigue and lack of alertness can seriously impact the effectiveness of any ISR operation.

One tool that promises to transform ISR operations is ground moving target indicator (GMTI) radar. GMTI radar has a unique ability to distinguish targets moving on land or water from surface clutter in bad weather or in darkness by virtue of the Doppler radar return of the moving targets. Thus, GMTI radar can detect the movement of enemy forces in real time, or in near-real time, throughout a surveillance area in any kind of weather.

One drawback to this approach is that airborne GMTI radar systems preforming surveillance can produce thousands of radar detections per minute. While the radar detection data can be formed into "tracks" by existing electronics, the radar tracks must be interpreted by a trained intelligence analyst. In particular, the ISR analyst must observe the radar tracks, and attempt to understand and identify the surveilled area's normal traffic patterns in a short period of time. Only after the operator understands the "normal" traffic flow can he distinguish an abnormal event. Obviously, observational learning and analysis like this is time-consuming, highly subjective and therefore requires substantial operator training. Furthermore, analyst fatigue, shift changes and rotation of personnel causes uneven knowledge of complex traffic patterns.

What is needed, therefore, is a system and method for automating and integrating the intelligence gathering process to improve a decision maker's situational awareness. A system and method are needed that substantially advance GMTI radar ISR by fully automating data exploitation and reduction to provide the warfighter with timely situational awareness (e.g., traffic pattern analysis). A system that automates ISR data mining is also needed to uncover new enemy activity patterns. Finally, an automated ISR system is needed for interfacing cloud based databases to provide worldwide automated ISR data extraction and reduction.

SUMMARY OF THE INVENTION

The present invention addresses the needs described above by providing a system and method for automating and integrating the intelligence gathering process to improve a decision maker's situational awareness. The present invention substantially advances GMTI radar ISR by fully automating data exploitation and data reduction to provide the warfighter with timely situational awareness (e.g., traffic pattern analysis). The present invention is configured to integrate GMTI radar tracks with a digital map of the surveilled area to provide the ISR analyst—and the decision maker—with a tactical display that integrates all of the available intelligence inputs. This display lifts the fog of war by providing a complete near-real time display of the surveilled area. The present invention mitigates some of the personnel issues described above, such as operator fatigue and lengthy operator training times. Moreover, the present invention limits the number intelligence analyst needed to analyze GMTI data. The present invention provides automated ISR data mining that can be used to uncover new enemy activity patterns. The automated ISR system of the present invention is configured to interface existing networks and cloud based databases to provide worldwide automated ISR data extraction and reduction.

One aspect of the present invention is directed to a system that includes at least one sensor input configured to provide radar track data, the radar track data being derived from one or more radar images. Each radar image is obtained by a radar system during a radar imaging dwell of a predetermined surveillance region. At least one digital memory is configured to store digital map data substantially corresponding to the predetermined surveillance region. A semantic reasoning engine is coupled to the at least one sensor input and the at least one digital memory. The semantic reasoning engine is configured to convert the radar track data from each radar image into an directed graph representation (DGR) of the predetermined surveillance region and iteratively combine each succeeding DGR with preceding DGRs obtained during a predetermined time frame to create a weighted directed graph (WDG) aligned and superimposed with the digital map data. The WDG includes first WDG elements corresponding to moving objects detected by the radar system during the radar imaging dwell. The semantic reasoning engine also is configured to compare the WDG to historical data to obtain at least one surveillance detection parameter. At least one alarm message is generated if the at least one surveillance detection parameter deviates from the historical data by a predetermined amount. At least one output device is coupled to the semantic reasoning engine, the at least one output device being configured to provide a representation of the digital map data, the WDG and the at least one alarm message.

In another aspect, the present invention is directed to a method that includes the step of providing radar track data. The radar track data is derived from one or more radar images, each radar image being obtained during a radar imaging dwell of a predetermined surveillance region. A digital map data substantially corresponding to the predetermined surveillance region is stored. The radar track data from each radar image is converted into a directed graph representation (DGR) of the predetermined surveillance region. Each succeeding DGR is iteratively combined with preceding DGRs obtained during a predetermined time frame to create a weighted, directed graph (WDG). The WDG includes first WDG elements that correspond to moving objects detected by the radar system during the radar imaging dwell. The WDG aligned and superimpose with the digital map data to form a WDG map. The WDG map is compared to historical data to obtain at least one surveillance detection parameter. At least one alarm message is generated if the at least one surveillance detection parameter deviates from the historical data by a predetermined amount.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
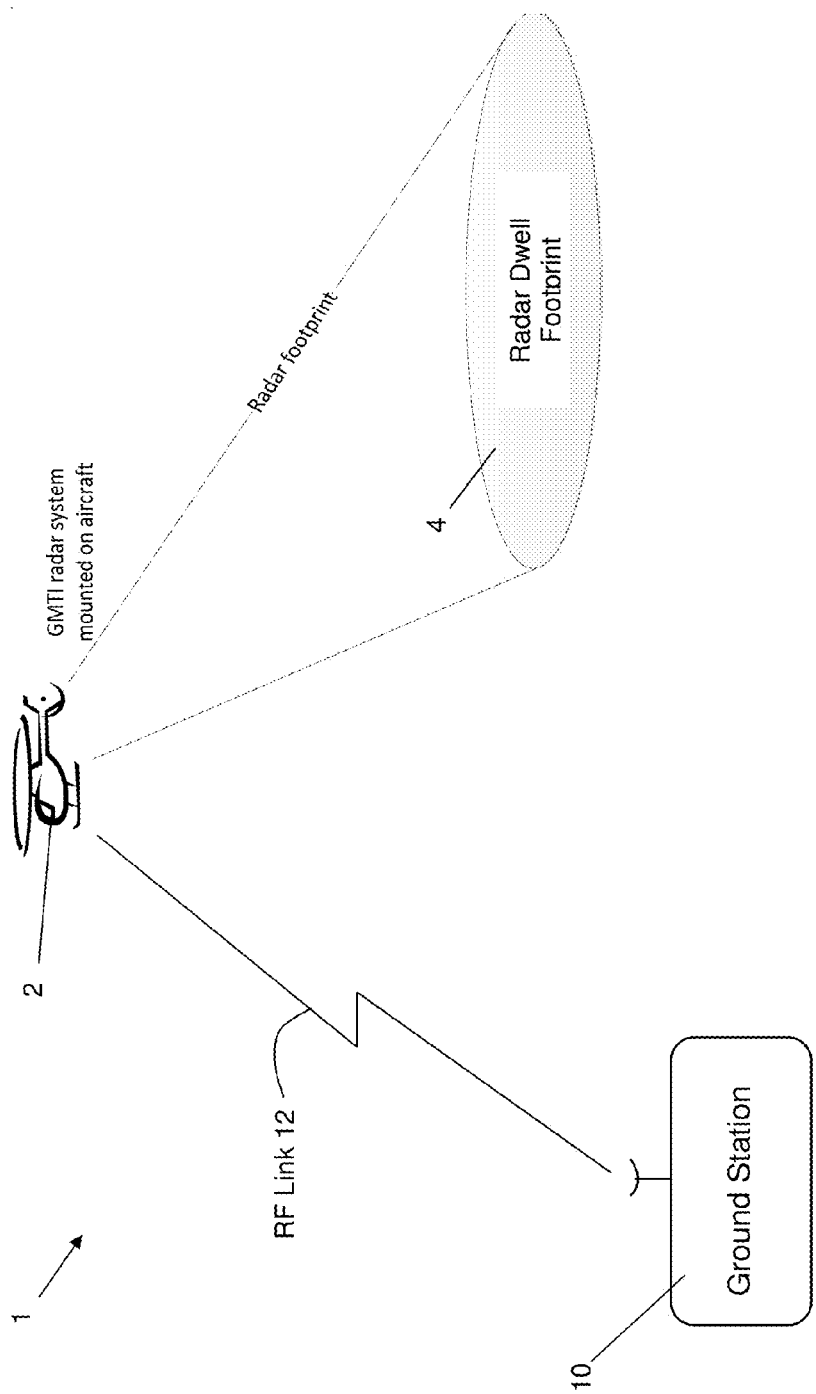
FIG. 1 is a high level diagram of the present invention in a tactical environment.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown at least in FIGS. 1 and 2, and is designated generally throughout by reference numeral 10.

As embodied herein, and depicted in FIG. 1, a high level diagram of the system 10 of present invention is shown in a tactical environment 1. The system 10 includes a GMTI radar 2 deployed in an airborne vehicle. The aircraft depicted in FIG. 1 may be implemented using any suitable platform including, but not limited to, helicopter, fixed wing aircraft, blimp or spacecraft as long as the platform can provide adequate power for the sensor payload and adequate stability for the sensor. In fact, an elevated platform (tower) capable of carrying a radar sensor system payload at sufficient altitude may be employed. When an aircraft is employed in the present invention, it may be manned or unmanned, e.g., a pilot may be on board the aircraft or control via a remote control facility disposed at the ground station 10 or in some other location.

The GMTI radar 2 is configured to obtain a radar image of the radar footprint 4 during each radar dwell. The GMTI radar will obtain many images, or raw radar detections every minute (the number of images per dwell is a function of the particular GMTI radar being employed in system 10). As those of ordinary skill in the art will appreciate, moving target indication radar typically takes advantage of the Doppler effect of a moving object. A moving target changes its position relative to the GMTI radar, and therefore, the phase of the radar reflection that returns from the target will be different for successive radar image dwells. In contrast, the reflected pulses from stationary targets (or clutter) will have substantially the same phase shift. Once the radar distinguishes moving tracks from stationary contacts, the radar tracker consolidates the moving radar detections into target tracks and rejects stationary detections as clutter. Those skilled in the art will also appreciate the raw data rate varies by the GMTI radar system, the size of radar footprint and the radar mode. The present invention may be practiced using any suitable GMTI radar apparatus.

The aircraft and the ground station communicate via an RF data link 12 that is used to transmit the radar tracking data to the ground station 10. As those of ordinary skill in the art will appreciate, any suitable high speed duplex data link capable of digital data transfer at a sufficiently high data rate can be employed in the present invention. Examples include, but are not limited to, Link 1, Link 11, Link 11B, Link 16 and the like. A proprietary data link may also be used. The RF data link may be configured as a line of sight (LOS) data link, beyond-LOS link, a satellite data link, or by way of an aircraft data relay. While only one aircraft is shown in the drawing of FIG. 1, those of ordinary skill in the art will recognize that the RF ground node 10 is configured to accommodate traffic from one or many airborne surveillance platforms 2. In one embodiment of the present invention, the radar data is formatted in NATO STANAG 4607 format and sent to the ground station 10 via the radio frequency data link 12.

The ground station 10 includes a computer cluster 16 that is equipped with a large data storage volume, and may include various operator displays that provide an ISR analyst with tracks and traffic flow graphs as described herein. Obviously, the ground station 10 includes an RF modem configured to operate over the tactical data link described above in order to communicate with the radar platform 2.

The radar dwell footprint 4 is the ground area imaged by the radar sensor and it may be stationary or move with the airborne platform 2. If stationary, the radar footprint may be trained to any suitable azimuth or elevation and may be part of a persistent surveillance system that observes ground activity over a period of minutes, hours, days, weeks or even months. The footprint 4 location is centered on notional areas of interest (NAIs) and can be relocated as dictated by the surveillance plan.

Figure 2:
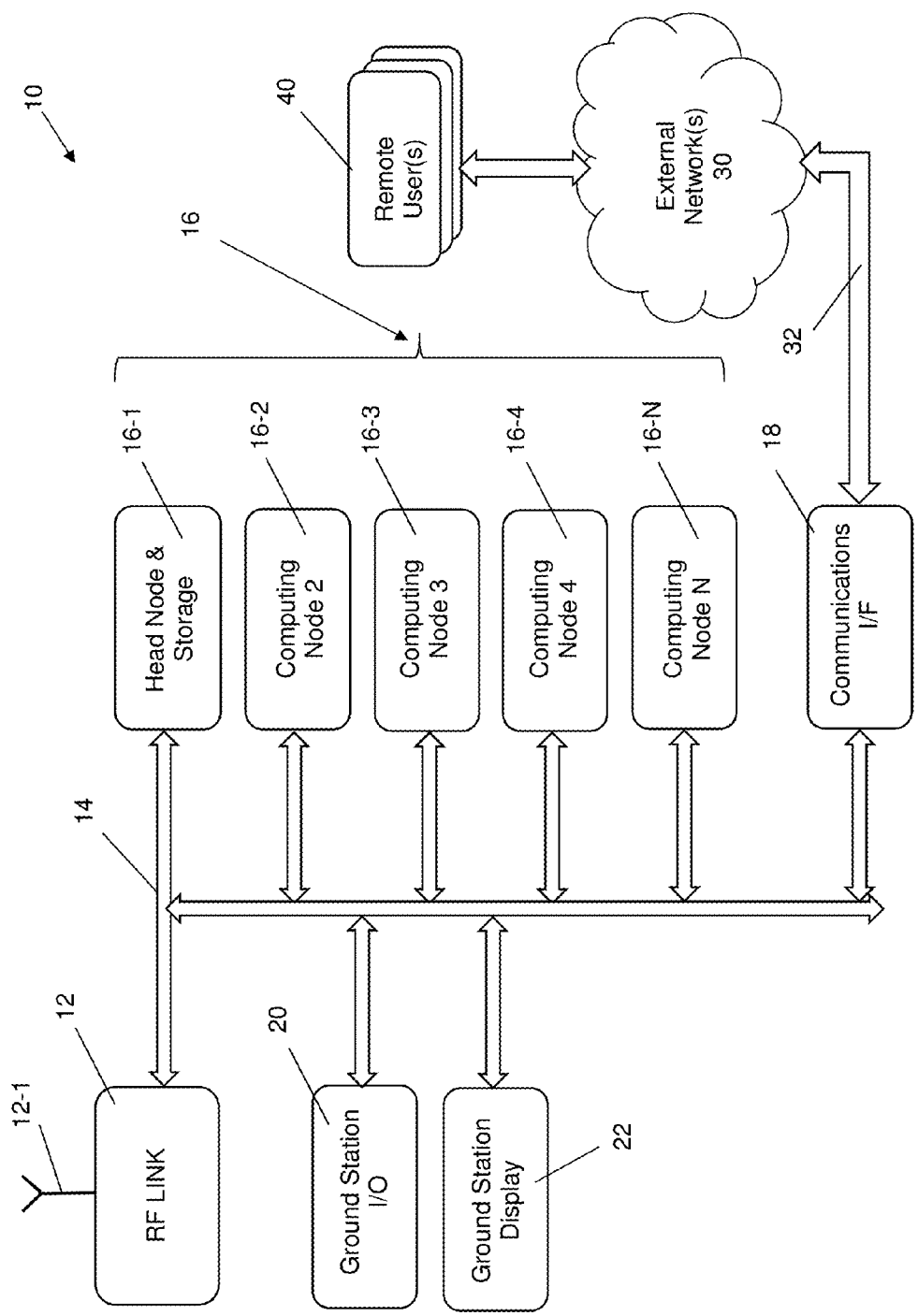
FIG. 2 is a diagrammatic depiction of a semantic reasoning system in accordance with an embodiment of the present invention.

As embodied herein and depicted in FIG. 2, a diagrammatic depiction of the ground station 10 in accordance with an embodiment of the present invention is disclosed. The ground station 10 includes one or more RF data links 12 configured to communicate with an airborne GMTI platform 2 (as shown in FIG. 1 and described above). The RF data links 12 propagate and receive RF data signals via one of more RF antenna(s) 12-1. The RF link equipment 12 is coupled to the computer cluster 16 by a network fabric 14. The network fabric 14 also interconnects ground station input/output (I/O) devices 20 and ground station display devices 22. The ground station 10 also includes one or more external communications links 18 that are configured to establish communications with remote users 40 via one or more external networks 30.

As briefly mentioned above, the ground station 10 may employ a computer cluster 16 that is used to implement a sematic reasoning engine as described and disclosed herein. The computer cluster 16 includes a head node 16-1 and N-1 computing nodes 16-2 to 16-N, wherein N is an integer number of computing nodes in the sematic reasoning engine. As those of ordinary skill in the art will appreciate, the number N depends on the size of the engine itself. If system 10 is implemented as a mobile unit, N will be relatively small. If, on the other hand, the ground station is a larger command and control unit, then N may be much larger. Those of ordinary skill in the art will recognize that sizing processing requirements is within the skill of the ordinary artisan.

The head node 16-1 includes server software configured to control the processing and data transfer within the computer cluster. Moreover, the head node 16-1 includes a database comprising high speed disk or solid state drives configured to provide multiple terabytes of data storage for storing historical traffic representations, intelligence messages, maps and other data components.

The computer cluster 16 also includes N tightly coupled server computers (16-2 to 16-N) that are slaved to the head node 16-1 and thus configured to operate as a single system in order to support the intensive computing operations described herein. The computing nodes 16-2 to 16-N provide processing resources on demand from the head node 16-2 in order to run the tracker, frame and super-frame comparison and the graph database described in greater detail below. In some implementations, computing nodes 16-2 to 16-N have a combined processing capacity of 1000 billion floating point operations per second or greater. In another embodiment of the invention, i.e., a smaller version, the system can be implemented with and runs on a very powerful computer (e.g., mainframe) or a heavy duty (multi-slot) server.

Each computing node 16-n typically runs the same operating system, but the cluster nodes may also reside on separate machines that run different operating systems. In this type of arrangement, a higher virtual layer is required to ensure interoperability. The computing nodes (16-1 to 16-N) are tied together and cohesively directed by a middleware layer (i.e., software) such that N-interconnected servers operate together as a single machine.

Those of ordinary skill in the art will appreciate that any suitable off the shelf arrangement may be employed herein. For example, the computer cluster 16 may be implemented using N—Apple XServe 2.3 GHz dual-processor machines running Mac OS X and using an InfiniBand interconnection fabric, N being an integer value greater than one. The Xserve computers may be replaced by desk top Macs which are not as dense as the rack mounted Xserve computers. A GNU/Linux approach, such as the Linux Virtual Server or the Linux-HA, may also be used to implement the present invention. A Microsoft solution may also be used to implement the present invention, e.g., the Compute Cluster Server 2003 is based on the Windows Server platform. With respect to middleware software, those skilled in the art will recognize that the "simple Linux utility for resource management" (SLURM) is a job scheduler currently employed by many computer clusters. Slurm has the added benefit of being an inexpensive (free) and open-source solution. gLite is another example of currently available middleware that is used for grid and cluster computing. Those skilled in the art will recognize that the present invention should be construed as not being limited to the aforementioned examples.

While the present invention may be implemented in other ways, the computer cluster arrangement (i.e., computer clusters) is recognized as an efficient and cost-effective means of improving performance over that of a single computer. In fact, because computer clusters can use off-the-shelf components, the cost advantages of a cluster vis a vis a single computer having comparable performance is considerable. Nonetheless, the method of the present invention may be implemented using any suitable computing arrangement.

Referring back to FIG. 2, the ground station is interconnected by a high speed digital network fabric 14 that is configured to provide duplex data communications between nodes. Digital fabric 14 may be implemented as an Ethernet local area network, or by the InfiniBand fabric mentioned above. In either case, the digital fabric 14 may be configured to accommodate digital traffic at a rate exceeding 10 GB/s per second depending on the implementation.

As shown in FIG. 2, the ground station 10 includes I/O devices 20 that enable operators to input data to the system and analyze output. For example, each operator and/or decision maker may be provided with a lap top or a desk top PC device wirelessly coupled to the system 10. Input devices may also include, inter alia, keyboards including alphanumeric and other keys for communicating information and command selections to the cluster 16. Other types of user input devices include cursor controls such as a mice, trackballs, or cursor direction keys for communicating directional information and command selections to control cursor movements on one or more display devices. With respect to output devices 22, the individual ISR analyst, as well as other personnel, may be provided with output devices such as a cathode ray tube (CRT), liquid crystal display, active matrix display, or plasma display for displaying the current raw radar data, radar tracks and historical average traffic representation as map overlays. In a combat information center type setting, the ground station output 22 also may include a large display that allows operators and decision makers to view relevant information as a team. A display of this type could also provide planned position indicator (PPI) display of the current raw radar data, radar tracks and historical average traffic representation as map overlays.

As described herein, the ground station 10 also includes one or more external communication interfaces 18 that allows it to provide remote locations and remote users with real time (or near-real time) radar data, traffic alert messages and traffic analysis. Remote users may be operators, analysts and/or decisions makers who are provided with real-time access, or near-real time access to current raw radar data, tracks, alerts and historical traffic representations, etc. The semantic reasoning system is also configured to identify likely future trends or events on the ground based on unusual or rapidly changing traffic patterns that are indicative of those future trends or events.

The communication interface may include hardware network access card(s) and/or driver software necessary for connecting the ground station to the external network fabric. The communications interface may be implemented using any suitable arrangement such as the public switched telephone network (PSTN), a digital subscriber line (DSL) card or modem, an integrated services digital network (ISDN) card, a cable modem, a telephone modem, or any other communication interface that provides a data communication connection to a corresponding type of communication line. The communication interface 18 may also interface a local area network (LAN) or a wide area network (WAN) using, e.g., Ethernet™ or Asynchronous Transfer Mode (ATM) cards that provide a data communication connections between the remote users 40 and the PC I/O devices 20. Communications interface 18 may also provide interconnections between PC I/O devices 20 and the global packet data communication network now commonly referred to as the Internet, or to data equipment operated by a network service provider. Wireless links can also be used to implement interface 18. In any such implementation, communication interface 18 may be configured to transmit and receive electrical, electromagnetic, or optical signals that carry digital data streams representing various types of information.

In another embodiment of the present invention, the computing nodes 16-1 to 16-N are distributed between the ground station 10 and one of more remote locations. For example, the ground station 10 may include computing nodes 16-1 to 16-M and a remote location(s) including the remaining computing nodes 16-(M+1) to 16-N. The computing nodes 16-(M+1) to 16-N are connected to a remote location 40 via an external network 30, and thus coupled to the ground station 10 by way of the communications interface 18. M is an integer value less than N, which is also an integer value. Thus, the computing resources are distributed between the local ground station 10 and one or more remote facilities 40. In this embodiment, the local computing nodes 16-1 to 16-M may be configured to perform foreground tasks such as converting the radar track data from each radar image into a directed graph representation (DGR) of the predetermined surveillance region and iteratively combining each succeeding DGR with preceding DGRs obtained during a predetermined time frame to create a weighted directed graph (WDG). The foreground processor may also align and superimpose the WDG with the digital map data. On the other hand, the background processing such as data mining could be performed at the remote computing nodes 16-(M+1) to 16-N. As alluded to above, each computing node may be implemented as a processing card disposed in a slot of a multi-slot server. Thus, the ground station may be implemented using a server hardware arrangement that includes M+1 server slots.

Further, the communication interface 18 can include peripheral interface devices, such as a Universal Serial Bus (USB) interface, a PCMCIA (Personal Computer Memory Card International Association) interface, etc. Although a single communication interface 18 is depicted in FIG. 2, multiple communication interfaces can also be employed.

Moreover, the computer cluster 16 can be configured to send and receive data, including program code, through the fabric 14, the communications interface 18, and the network(s) 30. In the Internet example, a server (not shown) might transmit requested code belonging to an application program for implementing an embodiment of the present invention through the network 30, interface 18 and the fabric 14. The computer cluster 16 may execute the transmitted code while being received and/or store the code in the attached storage devices, or in other non-volatile storage for later execution.

The term "computer-readable medium" as used herein refers to any medium that participates in providing data and/or instructions to the processor for execution. Such a medium may take many forms, including but not limited to non-volatile media, volatile media, and transmission media. Non-volatile media include, for example, solid state devices, and optical or magnetic disks. Volatile media include dynamic memory devices. Transmission media may include coaxial cables, copper wire and fiber optic media. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 3:
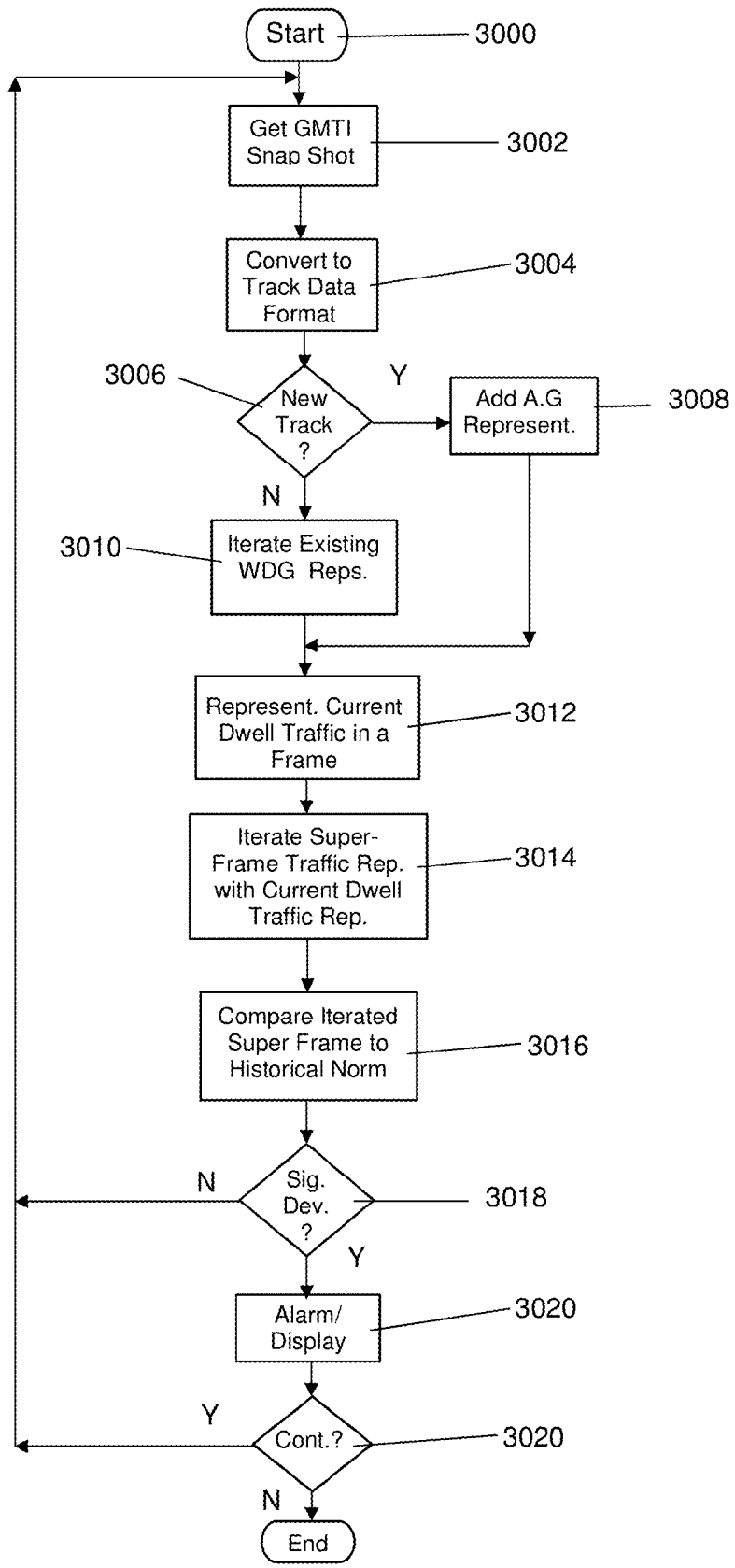
FIG. 3 is a flow chart showing a method performed by the system depicted in FIG. 2.

As embodied herein and depicted in FIG. 3, a flow chart showing a method performed by the system depicted in FIG. 2 is disclosed. Before describing the process depicted by FIG. 3, it must be noted that the present invention uses graph theory to display the GMTI radar data. Those skilled in the art will appreciate that a "graph" is a representation of a set of interconnected objects that are represented by nodes that are sometimes referred to as vertices. A link that interconnects two vertices is called an edge. Typically, a node is depicted in diagrammatic form as a dot or as small circles; the interconnecting "edge" is depicted as a line. Moreover, an edge may be directed or undirected. If the edge represents a symmetric relationship between two nodes, the edge is undirected. A directed edge, therefore, is used to show an asymmetrical relationship between nodes.

Mathematically speaking, a directed acyclic graph (DAG) is a directed graph that may have no directed cycles. A DAG is formed by a collection of nodes interconnected by directed edges; in other words, one cannot start at a given node and follow a sequence of edges to return back to that node. DAGs are very useful when it comes to modelling processes in which objects flow in a consistent direction through a network. The present invention, however, is not limited to directed acyclic graphs because some traffic pattern representations may be cyclic. Accordingly, the present invention uses weighted, directed, graphs (WDGs) that allow for traffic flows that complete a directed circuit on the graph. Stated differently, the present invention uses WDGs to model traffic flow over roads, rivers, trails or any other such pathway to determine traffic norms, and identify events that fall outside the norm. Reference is made to Vanderweele, T., Robins, J., *Signed Directed Acyclic Graphs for Causal Inference*, http://www.hsph.harvard.edu/james-robins/files/2013/03/SignedDAGs_.pdf, which is incorporated herein by reference as though fully set forth in its entirety, for a more detailed explanation of using directed acyclic graphs to draw conclusions about the presence of causal effects. Reference is also made to Alper, B., and et. al., Weighted Graph Comparison Techniques for Brain Connectivity Analysis, ACM CHI, Apr. 27-May 2, 2013, Paris, France, http://research.microsoft.com/en-us/um/people/nath/docs/brainvis_chi2013.pdf, which is incorporated herein by reference as though fully set forth in its entirety, for a more detailed explanation of using directed acyclic graphs to perform connectivity analyses of complex networks or pathways and displaying the connectivity analysis using node-link visualizations. The present invention employs these principles to implement WDGs to perform node-link analyses of traffic patterns, electromagnetic emissions, and also to predict possible outcomes of traffic patterns based on the WDG analysis.

Turning now to FIG. 3, the raw radar detections are produced by the radar during each GMTI radar dwell (3002). The radar tracker is configured, as described previously, to identify moving targets and reject stationary objects as clutter. The radar detections corresponding to moving targets are consolidated into radar tracks (3004). Each track is configured and stored as a digital "state vector;" each vector includes time, position, velocity, acceleration, radar cross section, and other parameters.

Before converting each radar track into a corresponding WDG representation, the computer cluster 16 must establish an observation frame and a super-frame. The cluster 16 is configured to set, adjust or tailor the frame timing to any suitable amount based on the conditions on the ground. In a fast moving environment, the frame time can be as short as a few minutes; in a longer developing surveillance operation, the frame time can be an hour or more. Each frame is part of a longer observation time period known as a super-frame, which can be, e.g., 6 hours, 12 hours or a 24 hour period. The cluster 16 is also configured to obtain known geographical features, such as roads, rivers, pathways, structures, and the like and create a digital map of the dwell area. This step is quite useful because it provides the operators and decision makers with contextual information. Reference is made to Baumgartner, S. V.; Krieger, G.; "Fast GMTI Algorithm For Traffic Monitoring Based On A Priori Knowledge," *Geoscience and Remote Sensing*, Geoscience and Remote Sensing, IEEE Transactions on (Volume: 50 , Issue: 11), which is incorporated herein by reference as though fully set forth in its entirety, for a more detailed explanation of using a priori data—such as known roads, bridges, bodies of water, etc.—to form a digital map of the traffic flow, and overlay radar track data thereon.

In step 3006, the cluster 16 evaluates the track to determine if it corresponds to an existing track or is a new contact. If it is deemed to be a new track, the processing cluster 16 provides it with a weighted directed graph representation (3008) that is incorporated into the weighted directed graph (WDG) representation (3012) of the current frame. If the processing cluster 16 recognizes the track as an existing one (3010), the WDG of the existing track is iterated (3012) by incorporating the state vector information provided by the most recent radar dwell into the current frame. The representation of the current dwell traffic (3012) is a weighted, directed graph that provides a real-time, complete representation of all traffic observed so far during the frame. Reference is made to Vanderweele et al. and Alper et al., which is incorporated herein by reference as though fully set forth in its entirety, for a more detailed explanation of using directed acyclic graphs to describe and visualize interconnected network structures.

In any event, once a given frame time has expired, the WDG of that frame is added to a super-frame WDG representation (3014). The super-frame ends after the predetermined observation interval (e.g., 4, 6, 12 or 24 hours). The completed super-frame is placed into the historical traffic database as a time-stamped weighted, directed graph data structure. This super-frame will be repeatedly retrieved and used for traffic comparisons and temporal ground activity analysis.

In step 3016, each WDG super frame is compared to a known historical traffic pattern stored in a database at head node 16-1 (or at a remote location 40). When the WDG comparison of the current super-frame with respect to one or more known historical traffic norms indicates that there is a significant deviation (3018), the processing cluster 16 is configured to transmit an alarm message to one or more PC terminals coupled to the I/O system 20, to the system display 22 or to both. In one embodiment, traffic vectors including volume, velocity, directivity, pattern configurations and timing data are compared to threshold values. If one or more parameters exceed a norm threshold, an alarm is generated. With respect to patterns, the data storage at cluster head node 16-1 includes a library of known patterns utilized by military or terrorist elements to perform recognized activities. If the processing cluster 16 finds that the super frame WDG includes a known pattern, another type of alarm may be generated and transmitted to all stakeholders via the communications interface 18, I/O 20 or display 22.

Once the comparison step is completed, the process will continue until it is terminated by the ISR operators (3020). Those skilled in the art will recognize that step 3016 requires a benchmark, i.e., a historical norm for a given area's traffic flow. Accordingly, the traffic analysis steps 3002-3016 may be performed over many super-frames in order to establish the norm (i.e., fully understand and characterize the observed traffic patterns). Reference is made to Allan Corbeil, Greg Van Patten, Laura Spoldi, Brian O'Hern, Mark Alford, *Data Mining of GMTI Radar Databases*, 2006 IEEE Radar Conference, which is incorporated herein by reference as though fully set forth in its entirety, for a more detailed explanation of linking GMTI vehicle detection sequences over multiple radar scans. The linked scans may be analyzed by Hough Transform (HT) processing to provide resolution of closely spaced vehicles and to characterize target kinematics to provide real-time operator cueing. The present invention may also employ this technique to support forensic analysis.

Figure 4:
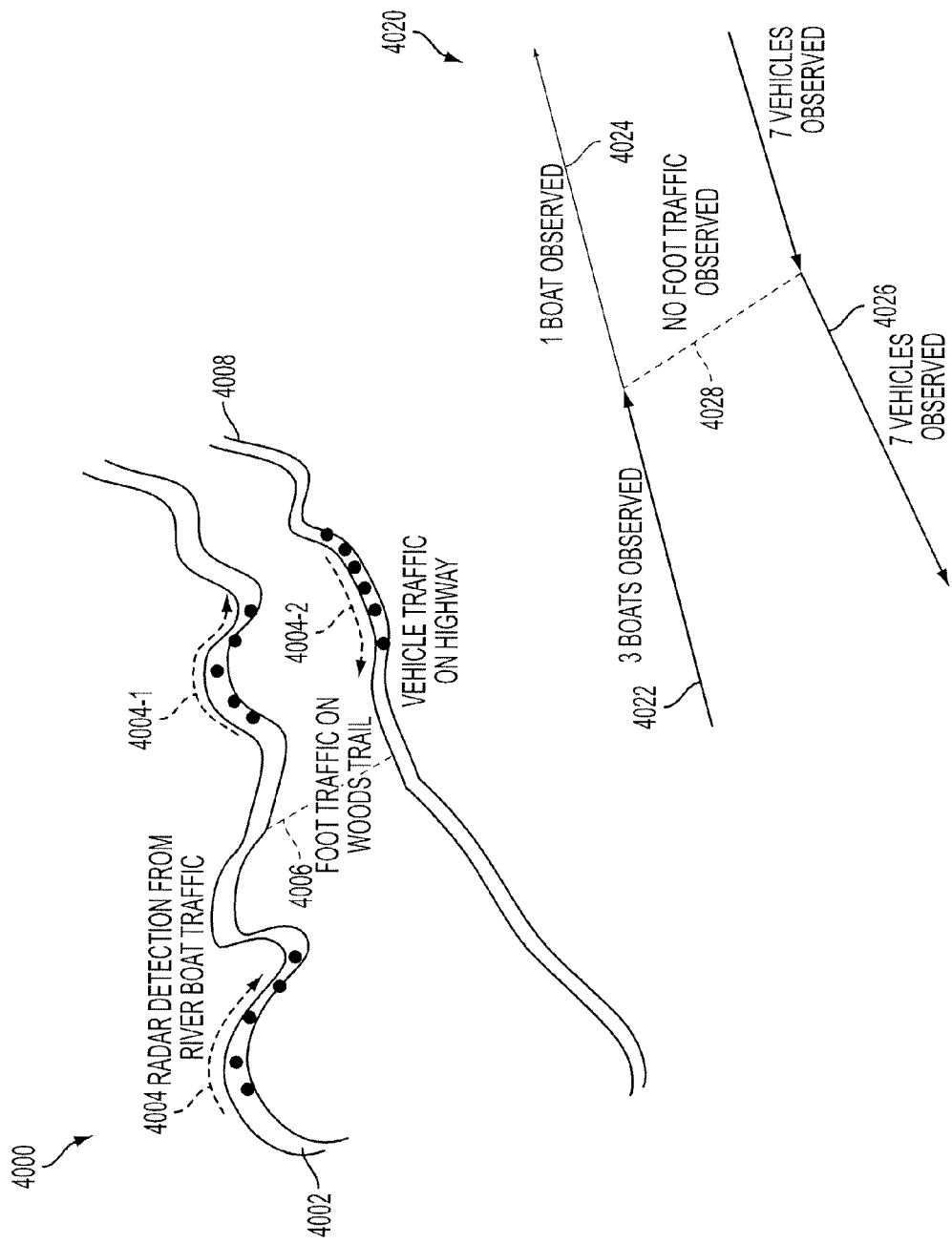
FIG. 4 is a map showing the tactical environment and the resultant weighted directed graph of the tactical environment.

In reference to FIG. 4, a map 4000 showing the tactical environment and the resultant directed graph of the tactical environment are shown. In the top left portion of FIG. 4, the map of the tactical environment includes parallel portions of a river 4002 and a roadway 4008. The river 4002 and the road 4008 are interconnected by a foot trail 4006 disposed within a wooded environment.

The bottom right portion of FIG. 4 shows a WDG frame 4020 created by the processing cluster 16 after processing GMTI radar images. The radar detections are formed into tracks by the tracker. These tracks are further consolidated into a single directed graph representation. Graph edges represent known pathways for travel and the nodes represent points where pathways intersect. See, FIG. 3, steps 3002-3012. The airborne GMTI radar detected three boats travelling east on the river 4002 and produced track 4004. As described above, cluster 16 represents the track 4004 as edge 4022. Similarly, the radar track 4004-1 corresponds to a GMTI radar detection of one boat traveling eastbound on river 4002. The decrease in traffic flow is represented by a thinner edge 4014. During the same one hour frame, the GMTI radar detected seven (7) vehicles traveling westbound on the roadway 4008 and created radar track 4004-2. The corresponding weighted graph edge created by cluster 16 is labeled 4026. Of interest is known footpath 4006. In this example, the GMTI radar did not detect any movement on the footpath during the one hour frame. Nonetheless, a dashed line 4028 is provided to the display 22 by the processor cluster 16 because decision makers have a need to know whether known thoroughfares are or are not being utilized. See, e.g., Baumgartner, referenced above.

Figure 5:
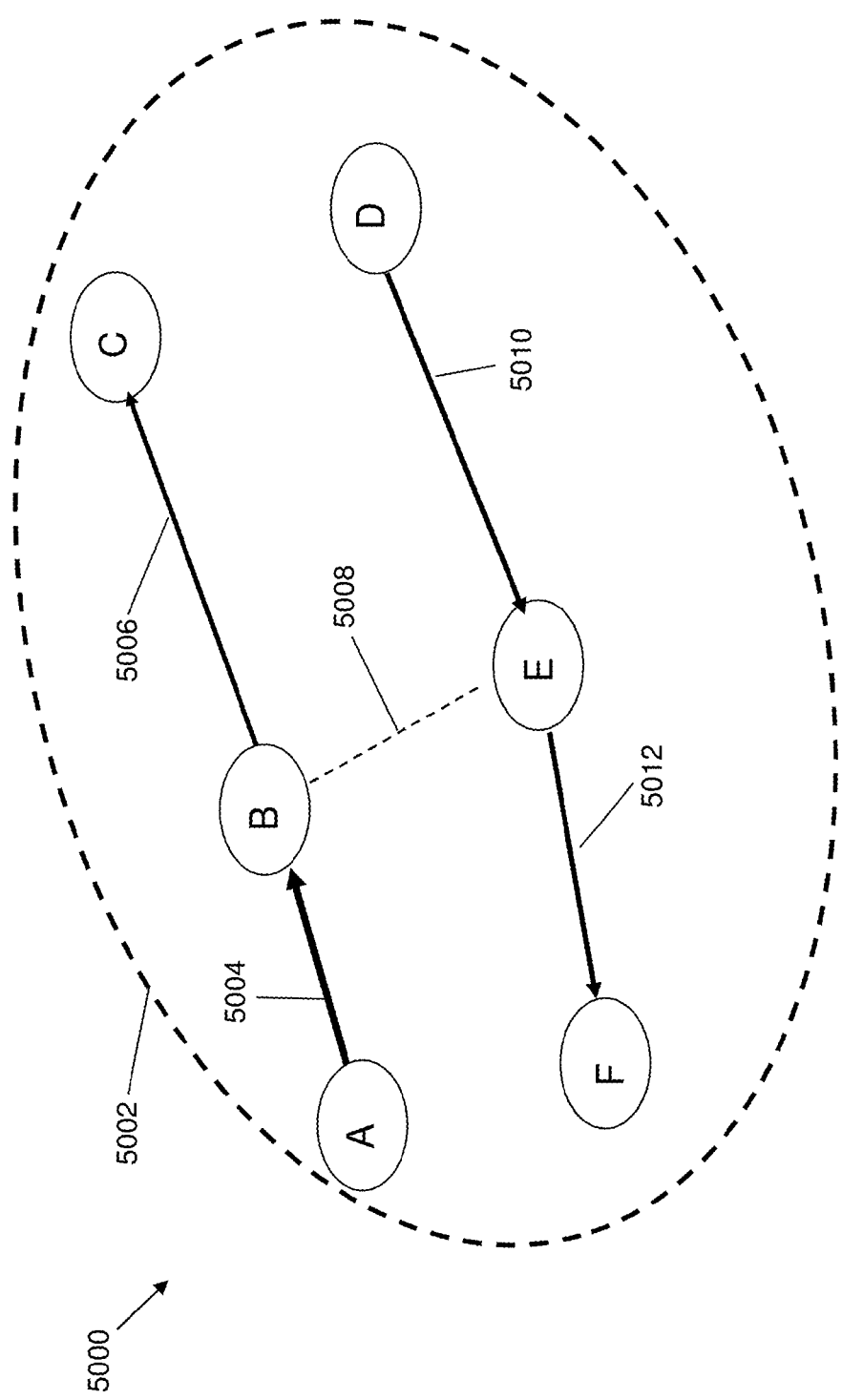
FIG. 5 is an illustration of a super-frame representation for the weighted directed graph depicted in FIG. 4.

Referring to FIG. 5, an illustration of a super-frame representation 5000 for the directed graph depicted in FIG. 4 is disclosed. This drawing figure provides a graphical analysis of river traffic over the super-frame, or over many super-frames (e.g., over a period of days, weeks, etc.) The accumulated radar track data provide input data for traffic analysis. The boat traffic patterns on the river, the foot traffic on trails and vehicle traffic on the highway could be quantified to provide a valuable ISR situational awareness summary. Heavier than normal traffic volume could indicate some kind of change or unusual activities wherein immediate knowledge of this change improves situational awareness. As described above, the super-frame (or longer) representation 5000 uses graph theory to display the GMTI radar data accumulated over time. Here, the set of interconnected objects (i.e., nodes) represent dwell area ingress points, dwell area egress points, and node/link interconnection points (e.g., a traffic intersection, or the location where a footpath terminates at a river or roadway). The links that interconnect the nodes represent traffic pathways (such as roads, rivers, paths, etc.) and the edges are used to represent various traffic parameters such as volume, directivity, etc.

Accordingly, the personnel viewing the super-frame 5000 via display 22 would interpret dashed line 5002 as the GMTI radar dwell footprint. Node A is the ingress point for river 4002 traffic, and node D is the ingress point for the westbound traffic on road 4008 (FIG. 4). The river traffic exits the dwell 5002 via egress node C and similarly, the west bound vehicular traffic exits the radar dwell 5000 via egress node F. Nodes B, E are points where the pathway 4006 intersects the river 4002 and the road 4008, respectively. An operator deployed in ground station 10 could "click on" edge 5004 and learn that the weighted line means that three boats have navigated the river in an eastbound direction between nodes A and B. The thinner edge 5006 means that only one boat navigated the river in an eastbound direction between nodes B and C. The operator could reasonably deduce that there are two vessels positioned at node B. Whether or not this is a "normal" occurrence depends on historical data. When the operator examines edges 5010 and 5012, he will discover that each of these edges represent seven vehicles traveling eastbound over the roadway 4008. The operator could reasonably conclude that the seven vehicles entered the radar dwell 5002 at Node D and exited the dwell 5002 via node F. Finally, the dashed edge 5008 indicates that the GMTI radar observed that there was no traffic over footpath 4006. The ISR operator could conclude that the personnel manning the two vessels tied up near node B did not traverse pathway 4006.

Figure 6:
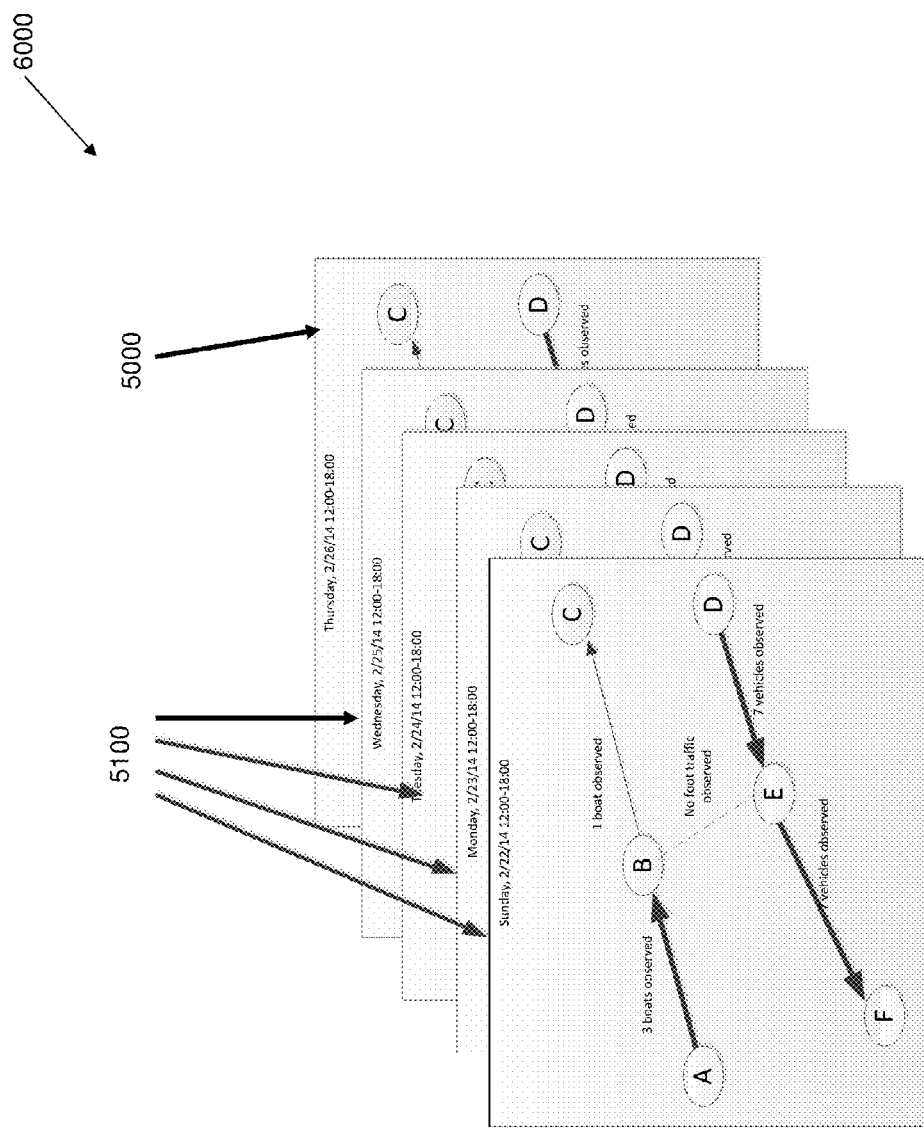
FIG. 6 is a chart illustrating the step of comparing a weighted, directed graphs from a current super-frame to historical data.

FIG. 6 is a chart illustrating the step of comparing a weighted, directed graph from a current super-frame 5000 to the WDGs 5100 derived from previous super frames representing normal traffic flows. In this step, the semantic reasoning engine 16 performs a side-by-side comparison of the current super-frame against one or more weighted, directed graph super-frames derived from observing the surveilled region during normal traffic flows. As disclosed above, the semantic reasoning performed by computer cluster 16 is configured to generate an alert/alarm message if the measured traffic parameters obtained from the current frame deviate from the historic norms by more than a predetermined amount. Again, certain traffic parameters (such as volume) can be evaluated by determining if the measured value exceeds threshold. Other parameters involve pattern recognition and comparison; for example, the presence of a large volume of foot traffic traversing a relatively unknown footpath that is historically devoid of traffic will be identified and flagged by the sematic reasoning performed by cluster 16. Briefly, stated, the parallel structure of the processing nodes 16-2 to 16-N are well suited for the parallel processing that enables the simultaneous comparison of multiple traffic frames or super-frame.

Figure 7:
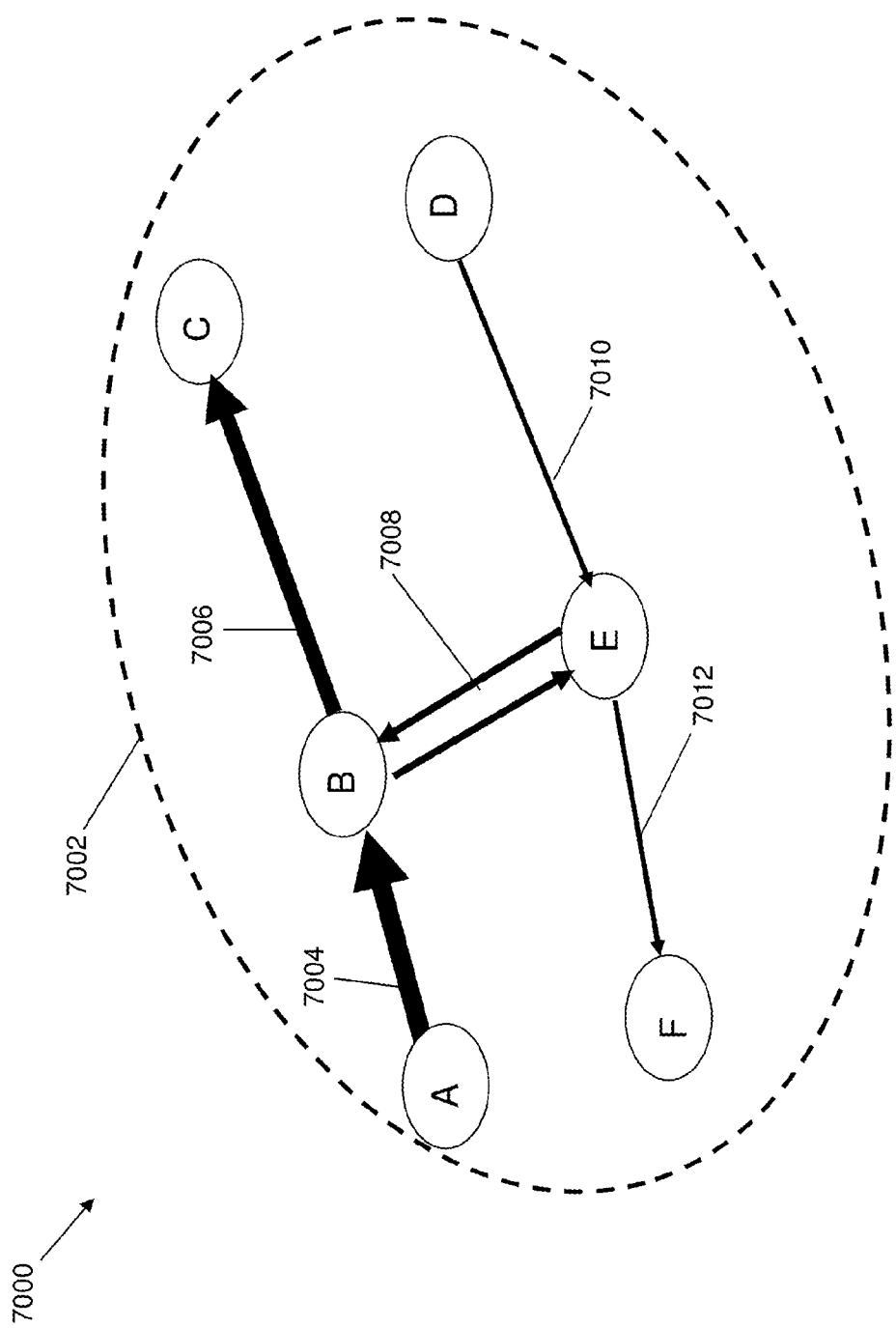
FIG. 7 is an illustration of a weighted directed graph obtained from the comparison depicted in FIG. 6.

Referring to FIG. 7, an illustration of a weighted directed graph 7000 obtained from the side-by-side comparison depicted in FIG. 6 is disclosed. The graph 7000 again shows the sensor footprint 7002 as being the entire area under surveillance by the airborne sensor platform 2. As before, Node A is the ingress point for river traffic and node D is the ingress point for the westbound traffic on the road 4008 (FIG. 4). The river traffic exits the surveillance area 7002 via egress node C, and similarly, the west bound vehicular traffic exits the radar dwell 7002 via the egress node F. Nodes B and E are points where the pathway 4006 intersects the river and the road, respectively. Note that the edges (7010, 7012) that represent the westbound vehicular traffic are not heavily weighted. This indicates that the vehicular traffic is in accordance with historic norms. On the other hand, the edges 7004 and 7006 are heavily weighted and indicate to the analysts that the river traffic observed in the current super-frame far exceed the 2-3 vessel flow that is normally observed in the other historic super-frames. The same is true for the edges 7008 that represent the traffic along the footpath.

The ground station display 22 (FIG. 2) may portray edges 7004, 7006, 7008 in red to graphically highlight the high level of concern. Alternatively, alphanumeric alerts or alarm messages may verbally convey the deviation from the norm. In any event, the unusually high traffic patterns on the river and footpath trigger the system to alert the operator and indicate, for example, that twenty-six (26) individuals were observed traversing the foot trail during a six hour period. During that same period, seventeen (17) separate vessels were observed navigating the river. Depending on the mission, the increased level of traffic might indicate elevated activity due to smuggling or troop buildup in the surveillance area 7000. In any event, the ISR operator is spared from studying hours or days of traffic flows in order to establish the normal traffic patterns for region 7000. Instead, the semantic reasoning engine of the present invention is configured to obtain radar track data over a period of time, establish the area's norms, and allow the ISR analyst to engage the system after the data has been reduced to a usable format. Unusual levels of traffic, when compared to past traffic patterns, produce an operator alert when volume difference exceed an operator-specified threshold. Automated traffic intelligence is distributed to nearby friendly units. This information adds to the unit's overall situational awareness.

Figure 8:
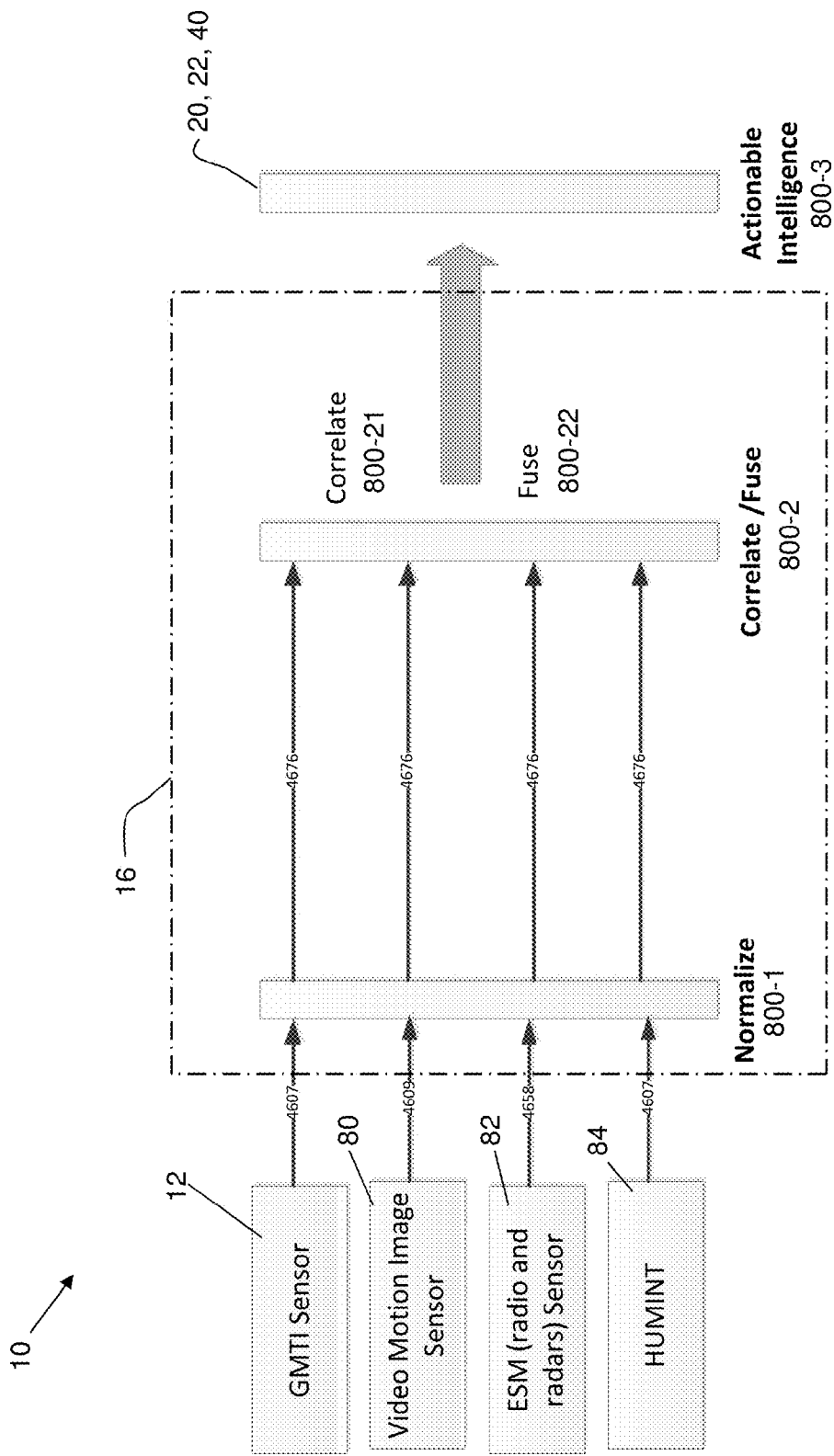
FIG. 8 is a block diagram of a system in accordance with another embodiment of the present invention.

As embodied herein and depicted in FIG. 8, a block diagram of system 10 in accordance with another embodiment of the present invention is disclosed. In this embodiment, the RF link 12, the fabric, computer cluster 16, communications interface 18, I/O 20 and display may be configured in a manner similar to that depicted in FIG. 2. This embodiment differs from the embodiment of FIG. 2 in that three additional intelligence inputs are provided to the semantic reasoning engine implemented by the processing cluster 16. As before, the RF link 12 provides GMTI radar sensor data stream. However, the system 10 now accommodates a video motion image (MI) sensor 80 that provides a data stream from an EO/IR ball or similar video processing system. Moreover, electromagnetic sensor (ESM) 82 provides radio and radar intercept geo-location detection points and tracks from communications and radar intercept sensors. The system also accommodates a human intelligence (HUMINT) input 84 that is derived from ground observations, voice reports, airborne sightings and other similar sources.

The computer cluster 16 is configured to perform a normalizing step 800-1 to thereby align and reconcile all sensor sources to a common geographic reference. The normalizing process also digitizes each datum in accordance with a predetermined digital standard. This allows the WDG for a surveillance region to properly reflect all of the available information and intelligence. The computer cluster 16 is also configured to normalize, correlate and fuse the data from inputs 80-84 as part of steps 3004-3012 (See, FIG. 3). Correlation (800-21) refers to the process of assigning an intelligence input to an edge or a previously identified target. The step of fusing (800-22) combines various intelligence inputs to form composite tracks that provide the operator with a more detailed understanding of an edge or a target.

As before, the processing cluster 16 is configured to provide actionable intelligence to the end user in real time, or in near-real time. Decision makers are alerted to unusually heavy or light traffic volume, abrupt or unexpected changes in traffic patterns.

In one embodiment of the present invention, the data from each sensor source is converted into the standard NATO track format commonly referred to as STANAG 4676. Under this scheme, GMTI radar detections and HUMINT are formatted as 4607 data, MI intelligence is formatted as 4609 data, and ESM is formatted as 4658 data. As noted above, sensor fusion involves combining various sensor data sources to form composite tracks that are formatted as STANAG 4676 XML data. As before, the STANAG 4676 tracks are electronically overlaid onto an electronic map by the Semantic Reasoning Engine.

Figure 9:
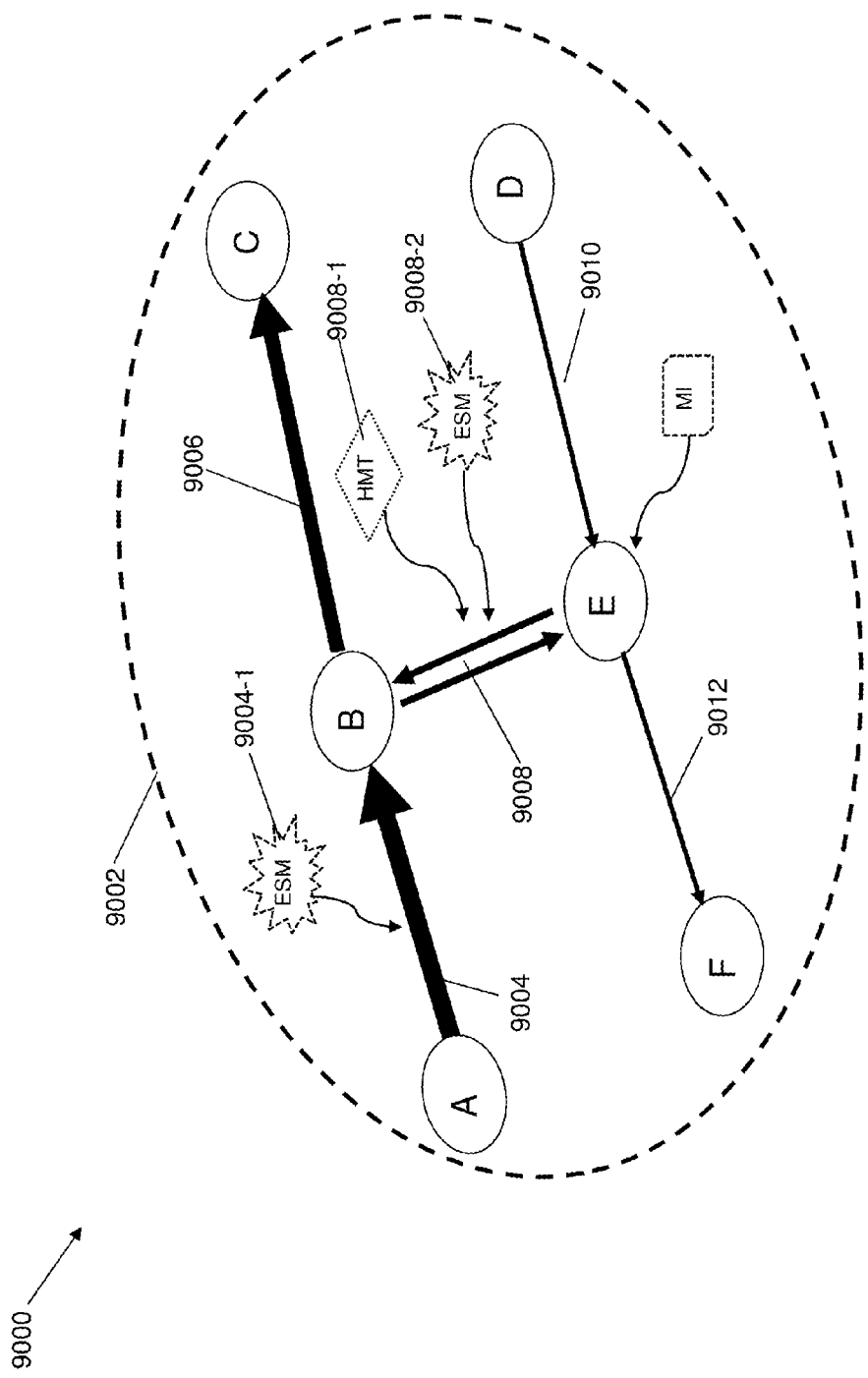
FIG. 9 is an illustration of a display showing a weighted directed graph obtained from the system depicted in FIG. 8.

Referring to FIG. 9, an illustration of a display showing a weighted directed graph obtained from the system depicted in FIG. 8 is disclosed. While the weighted graph of FIG. 9 has many similarities to the one depicted in FIG. 7, it also features many enhancements. The GMTI sensor footprint 9002 is the area under surveillance. As in FIG. 7, like reference designations refer to the same nodes (A-F) and similar edges (i.e., edges 7004-7012 correspond to edges 904-9012). As before, the edges 9004 and 9006 are heavily weighted and indicate to the analysts that the river traffic observed in the current super-frame far exceeds the 2-3 vessel flow that is norm for this region. The same is true for the edges 9008 that represent the traffic along the footpath.

Like the previous example depicted in FIG. 7, the sematic reasoning engine detects twenty-six (26) individuals traversing the foot trail and seventeen (17) separate vessels navigating the river during the same six hour period. In FIG. 9, the additional sensor inputs provide additional information that allows the operators to more fully assemble pieces of the puzzle. For example, the processing cluster 16 uses the additional sensor inputs to provide the display 22 with a HUMINT icon "HMT" and an ESM icon. When the operator clicks on the HMT icon a dialog box opens on the display to indicate that an informant has warned the authorities that a certain terrorist cell has planned to infiltrate the surveillance region. The ESM inputs indicate the presence of wireless radio traffic. Again, a dialog box opens on display 22 and indicates that one of the cell phones being used belongs to a known member of the cell. At this point, the decision maker has enough information to direct assets to intercept the detected targets in real time or in near-real time.

Figure 10:
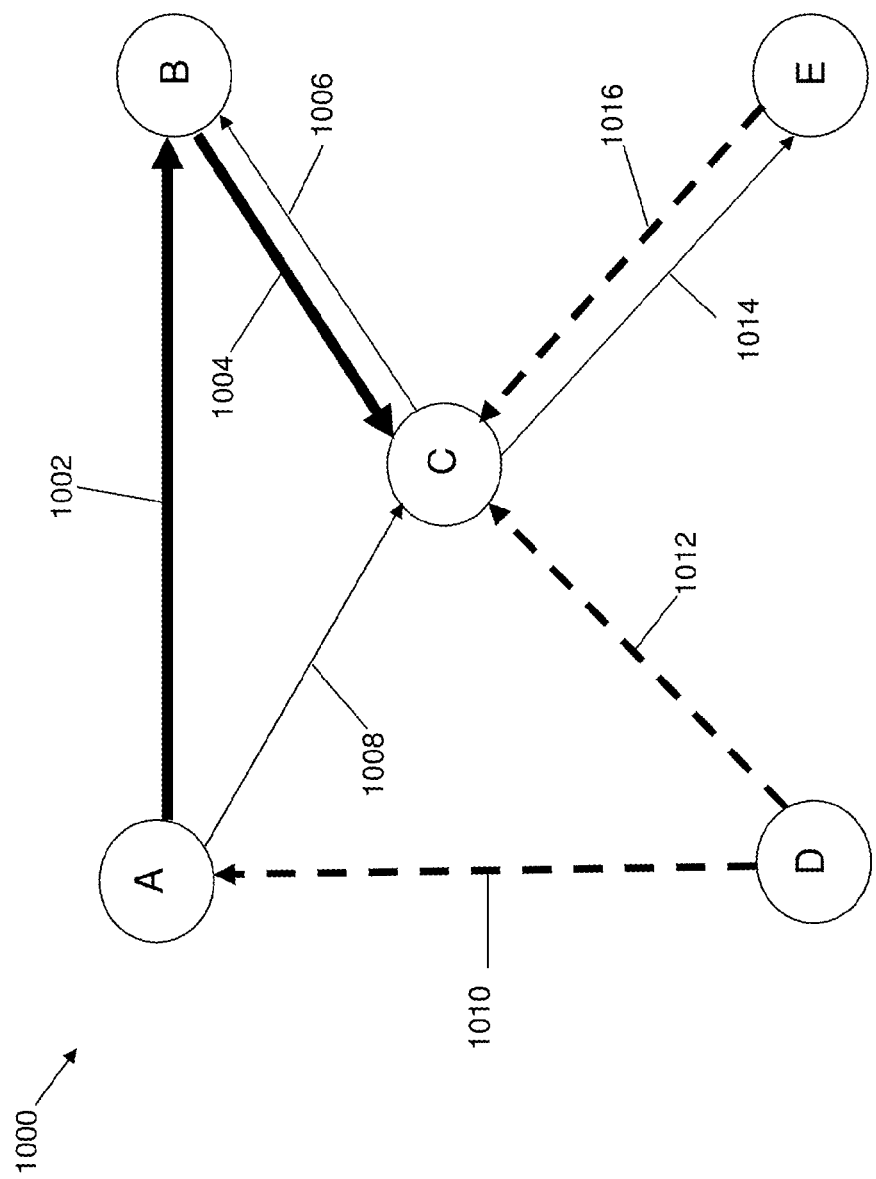
FIG. 10 is an illustration of a display showing wireless voice and data communications intercepted by an airborne electronic warfare system.

Referring to FIG. 10, an illustration of a display showing wireless voice and data communications intercepted by an airborne electronic warfare system is disclosed. The emitter nodes A-E are geolocated by the airborne EW system through multi-lateration or Doppler intercept methods. The weighted, directed graph edges represent transmissions to/from nodes. The edges represent the data volume and type of voice/data communications message traffic. The edged are weighted by the volume of the communications traffic. Thus, node A represents a geo-located radio voice interception and edge 1002 represents a 125 kb/s voice channel directed to node B, which also represents a geo-located radio voice interception. Edge 1004 also represents a 125 kb/s voice channel. Edges 1006 and 1014 represent a 6 KB/sec voice channel from Node C. Edges 1010, 1012 and 1016 are radio data links.

The Semantic Reasoning engine 16 is configured in this embodiment to build frames and super-frames representing historical patterns of wireless traffic. Changes in data volume that could indicate ground activity would be detected by comparing present data frames with multiple historical data frames. In another embodiment of the present invention, the elevated wireless traffic detected by EW is combined with the ground traffic (boats, vehicles and dismounts) to show the coordinated activities associated with smuggling, troop buildup or other adversary covert activities.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system comprising:
at least one sensor input configured to provide radar track data, the radar track data being derived from one or more radar images, each radar image being obtained by a radar system during a radar imaging dwell of a predetermined surveillance region;
at least one digital memory configured to store digital map data substantially corresponding to the predetermined surveillance region;
a semantic reasoning engine coupled to the at least one sensor input and the at least one digital memory, the semantic reasoning engine being configured to convert the radar track data from each radar image into an directed graph representation (DGR) of the predetermined surveillance region and iteratively combine each succeeding DGR with preceding DGRs obtained during a predetermined time frame to create a weighted directed graph (WDG) aligned and superimposed with the digital map data, the WDG including first WDG elements corresponding to moving objects detected by the radar system during the radar imaging dwell, the semantic reasoning engine also being configured to compare the WDG to historical data to obtain at least one surveillance detection parameter, at least one alarm message being generated if the at least one surveillance detection parameter deviates from the historical data by a predetermined amount; and
at least one output device coupled to the semantic reasoning engine, the at least one output device being configured to provide a representation of the digital map data, the WDG and the at least one alarm message.

2. The system of claim 1, wherein the WDG from the predetermined time frame is combined with preceding WDGs obtained from preceding time frames to obtain a WDG super-frame.

3. The system of claim 2, wherein the WDG super-frame is compared to the historical data to obtain the at least one surveillance detection parameter.

4. The system of claim 3, wherein the historical data includes at least one historical WDG super-frame.

5. The system of claim 1, wherein the predetermined time frame is selected from a range of time periods based on conditions in predetermined surveillance region.

6. The system of claim 1, wherein the at least one sensor input is coupled to a GMTI radar via an RF link.

7. The system of claim 1, wherein the at least one sensor input is configured to provide video data, intelligence data, or electromagnetic sensor (ESM) data.

8. The system of claim 7, wherein the ESM data is elected from a group of ESM data that includes signal direction data, cellular telephone data, radio frequency data, or signal modulation data.

9. The system of claim 1, wherein the at least one digital memory includes a relational database.

10. The system of claim 1, wherein the at least one digital memory includes at least one disk drive memory device or at least one solid state memory device.

11. The system of claim 1, wherein the semantic reasoning engine comprises at least one computing device.

12. The system of claim 11, wherein the at least one computing device is implemented using a computer cluster, a mainframe computer or a multi-slot server computer.

13. The system of claim 1, wherein the semantic reasoning engine is comprised of a computer cluster including N computers disposed in parallel, N being an integer value.

14. The system of claim 13, wherein the N computers includes a head node coupled to N-1 computing nodes, the head node being configured to control data transfers between the N-1 computing nodes.

15. The system of claim 14, wherein at least one node of the N-1 computing nodes is configured to process the WDG and at least one second node of the N-1 computing nodes is configured to process the historical data.

16. The system of claim 15, further comprising a communication interface coupled to at least one remote network, the N-1 computing nodes including 1-M computing nodes disposed in a local ground station and (M+1)-N computing nodes disposed remotely, the 1-M computing nodes being coupled to the (M+1)-N computing nodes via the communication interface, M being an integer value less then N.

17. The system of claim 16, wherein the communication interface is configured to transfer data and/or programming instructions between the 1-M computing nodes and the (M+1)–N computing nodes.

18. The system of claim 13, wherein each of the N computers runs an identical operating system, or wherein at least one of the N computers runs a first operating system that differs from at least one other of the N computers.

19. The system of claim 1, further comprising at least one communication interface coupled to at least one external network.

20. The system of claim 19, wherein the at least one external network is selected from a group of networks that includes the Internet, a packet switched network, an ATM network, a DSL network, an ISDN network, a cloud based network, a PSTN, a LAN, or a WAN.

21. The system of claim 1, further comprising at least one input device coupled to the semantic reasoning engine, the at least one display and the at least one digital memory via a digital bus fabric.

22. A method comprising:
providing radar track data, the radar track data being derived from one or more radar images, each radar image being obtained during a radar imaging dwell of a predetermined surveillance region;
storing digital map data substantially corresponding to the predetermined surveillance region;
converting the radar track data from each radar image into a directed graph representation (DGR) of the predetermined surveillance region;
iteratively combining each succeeding DGR with preceding DGRs obtained during a predetermined time frame to create a weighted directed graph (WDG), the WDG including WDG elements corresponding to moving objects detected by the radar system during the radar imaging dwell;
aligning and superimposing the WDG with the digital map data to form a WDG map;
comparing the WDG map to historical data to obtain at least one surveillance detection parameter; and
generating at least one alarm message if the at least one surveillance detection parameter deviates from the historical data by a predetermined amount.

23. The method of claim 22, further comprising the step of representing the DGR, the WDG, the digital map, the WDG map and/or the WDG elements on a display.

24. The method of claim 22, further comprising the step of obtaining a WDG super-frame by combining the WDG from the predetermined time frame with WDGs obtained from preceding time frames.

25. The method of claim 24, wherein the WDG super-frame is compared to the historical data to obtain the at least one surveillance detection parameter.

26. The method of claim 25, wherein the historical data includes at least one historical WDG super-frame.

27. The method of claim 24, wherein the predetermined time frame is selected from a range of time frame periods and the WDG super-frame is selected from a range of super-frame time periods based on conditions in the predetermined surveillance region.

28. The method of claim 27, wherein the range of time frame periods includes a one-minute time frame period and the range of super-frame time periods includes a ten minute super-frame time period.

* * * * *